(No Model.) 3 Sheets—Sheet 1.

F. J. PATTERSON & I. P. DAVIS.
CASH REGISTER AND INDICATOR.

No. 344,982. Patented July 6, 1886.

Witnesses:
W. C. Jirdinston.
E. W. Rector

Inventors:
Frank J. Patterson
and Isaac P. Davis
by Steinbeck
their Attorneys.

(No Model.) 3 Sheets—Sheet 2.

F. J. PATTERSON & I. P. DAVIS.
CASH REGISTER AND INDICATOR.

No. 344,982. Patented July 6, 1886.

Witnesses:
W. C. Jirdinston.
E. W. Rector

Inventors
Frank J. Patterson
and Isaac P. Davis
by Stimrick
their Attorneys.

(No Model.) 3 Sheets—Sheet 3.
F. J. PATTERSON & I. P. DAVIS.
CASH REGISTER AND INDICATOR.
No. 344,982. Patented July 6, 1886.
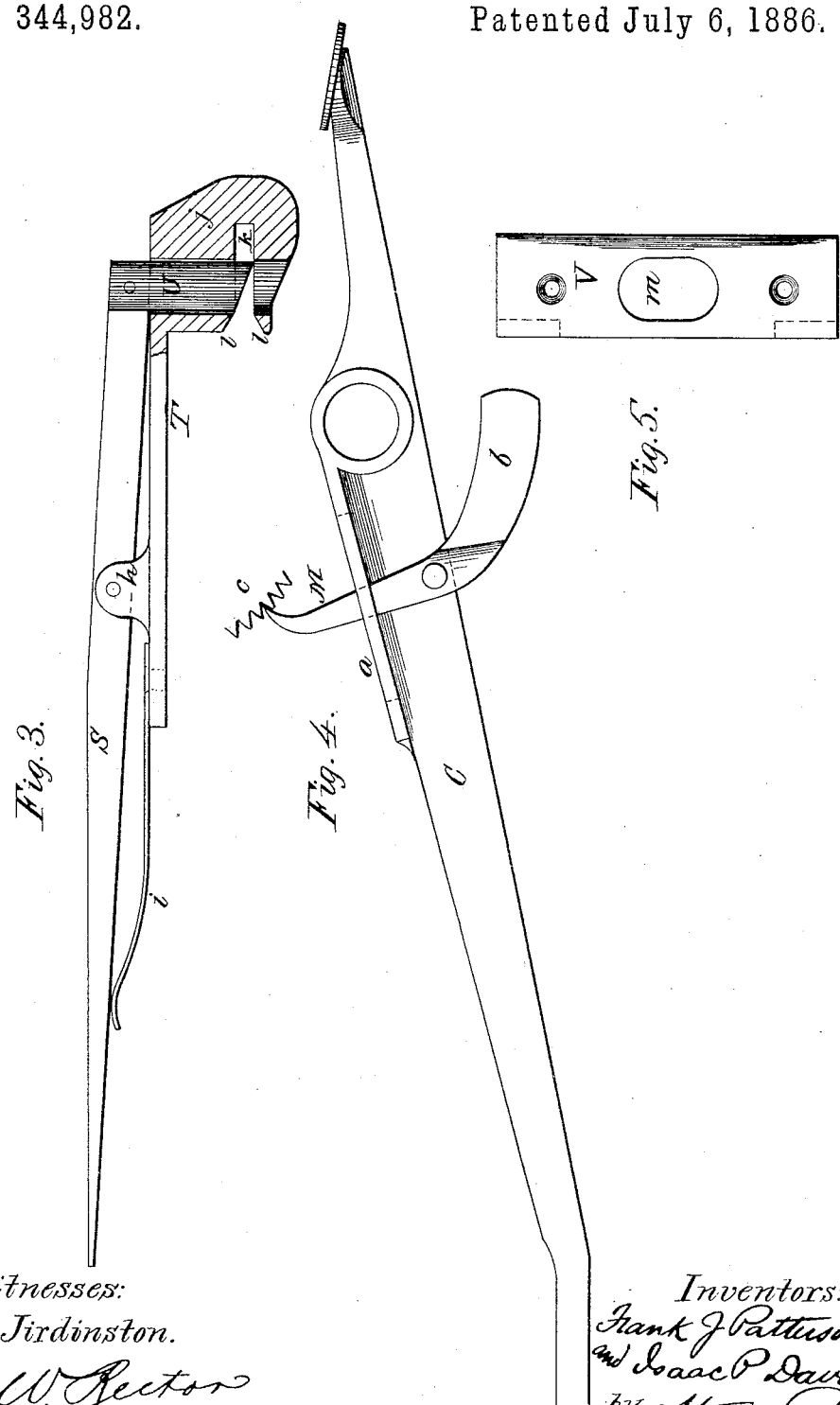
Witnesses:
W. C. Jirdinston.
E. W. Rector
Inventors:
Frank J. Patterson
and Isaac P. Davis
by Steinbeck
Their Attorneys.

UNITED STATES PATENT OFFICE.

FRANK J. PATTERSON AND ISAAC P. DAVIS, OF DAYTON, OHIO, ASSIGNORS TO THE NATIONAL CASH REGISTER COMPANY, OF SAME PLACE.

CASH REGISTER AND INDICATOR.

SPECIFICATION forming part of Letters Patent No. 344,982, dated July 6, 1886.

Application filed November 14, 1885. Serial No. 182,808. (No model.)

*To all whom it may concern:*

Be it known that we, FRANK J. PATTERSON and ISAAC P. DAVIS, citizens of the United States, residing at Dayton, in the county of Montgomery and State of Ohio, have invented certain new and useful Improvements in Cash Registers and Indicators, of which the following is a full, clear, and exact description, reference being had to the accompanying drawings, forming a part of this specification.

Our invention relates to improvements in cash registers and indicators designed for the use of store-keepers and others as a means of accurately registering the total cash receipts for any given period of time—as a day, for instance—and for indicating to the customers that the amount paid has been registered by disclosing to their view such amount upon figured tablets.

The special style of machine to which the present invention appertains is best illustrated by the constructions disclosed by the following Letters Patent: No. 271,363, granted to J. Ritty and J. Birch January 30, 1883; No. 318,485, granted to C. H. Maltby May 26, 1885; No. 303,974, granted John Birch August 26, 1884, and No. 321,988, granted July 14, 1885, to C. H. Maltby.

The novelty of our invention will be herein set forth, and distinctly pointed out in the claims.

Figure 1:
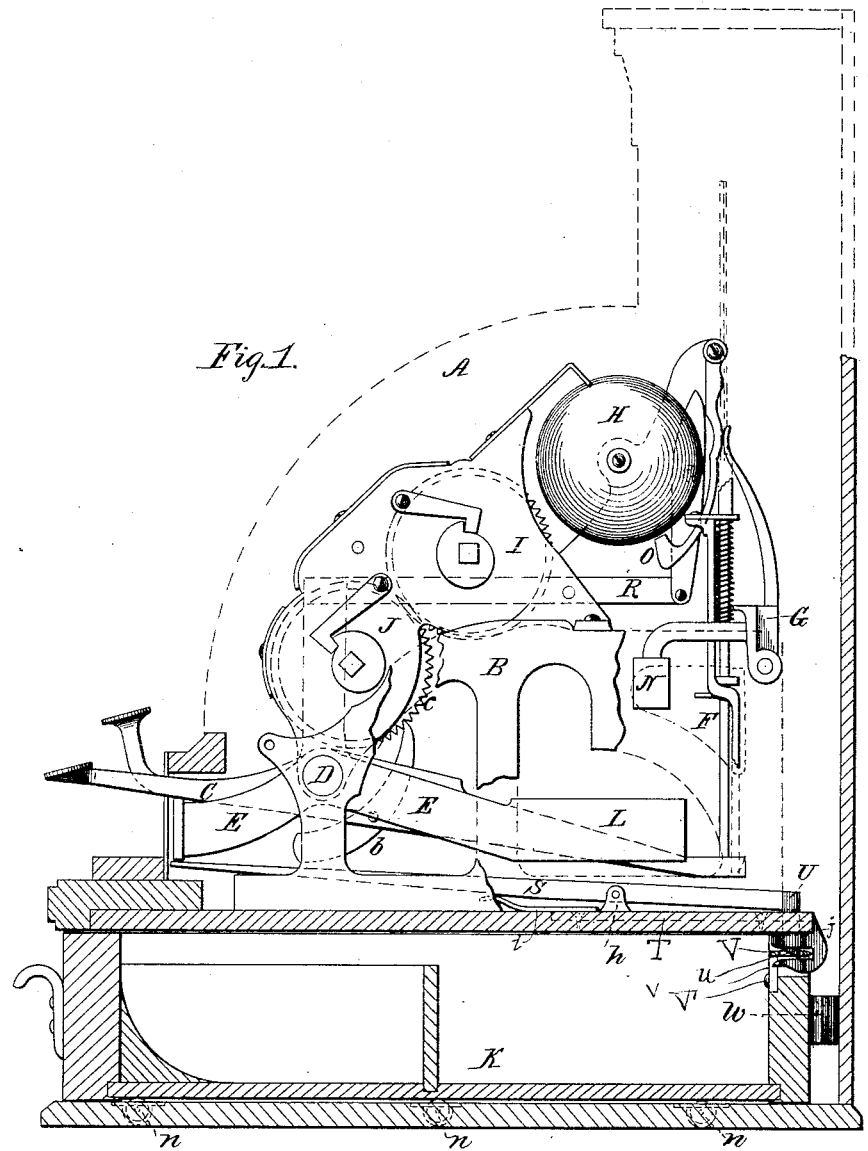
Figure 2:
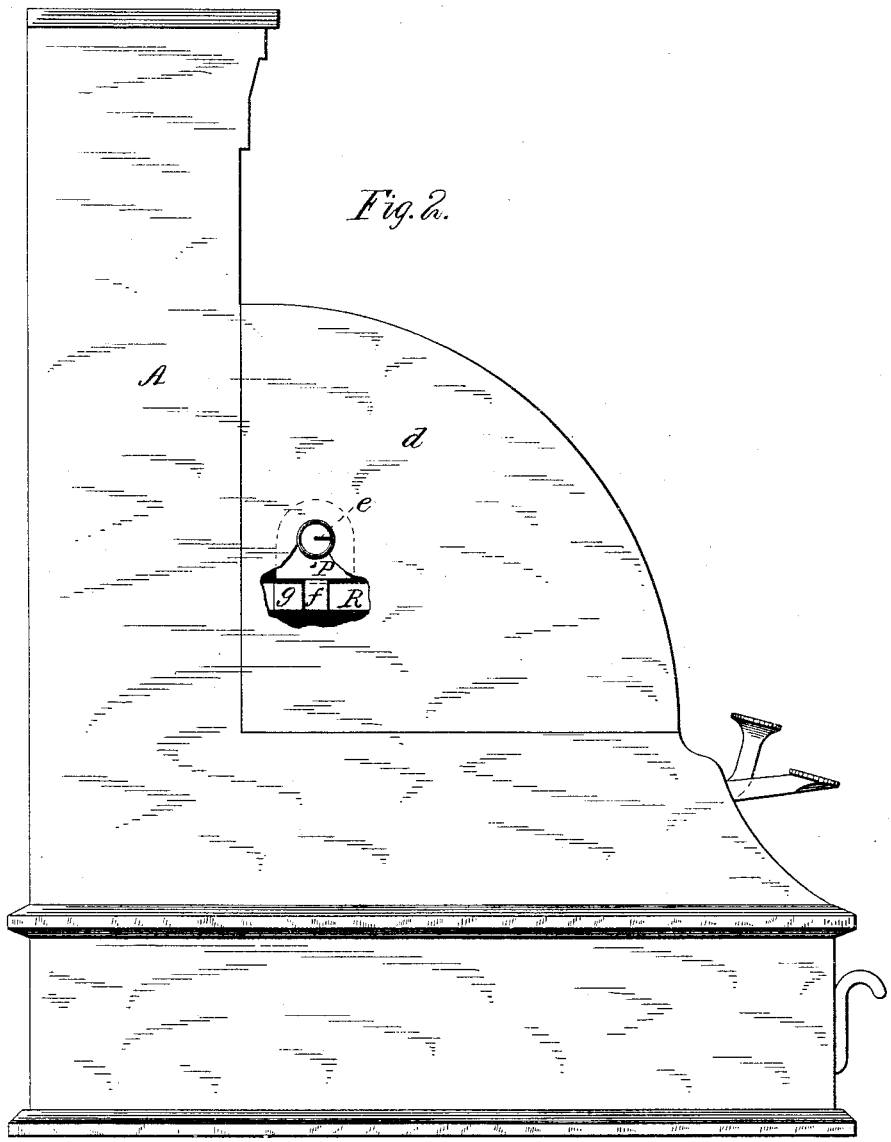

In the accompanying drawings, Figure 1 is a sectional side elevation, with portions of the frame-work broken away, of a cash register and indicator embodying our present improvements. Fig. 2 is a side elevation of the machine, with a portion of the removable cover broken away to illustrate the locking mechanism. Fig. 3 is an enlarged detail elevation, partly in section, of the bolt mechanism for locking and releasing the drawer. Fig. 4 is an enlarged side elevation of one of the operating-keys and weighted dog secured thereto. Fig. 5 is an enlarged plan view of the drawer-locking plate.

The same letters of reference are used to indicate identical parts in all the figures.

The general features of construction are preferably those described and shown in Patent No. 321,988, referred to above, though the special features shown in any of the patents above referred to may be employed.

Like the machines above mentioned, the object of the present machine is to indicate to the purchaser upon a figured tablet the amount of the sale by operating the proper key, and at the same time to sound an alarm and release the money drawer or till, which is partially projected from the case, while the same operation of the key also insures the registration of the amount paid in.

It is not here necessary to describe the construction of the machine further than to say that A is the case; B, the frame-work supporting the mechanism within the case; C, the operating-keys journaled upon the shaft D; E, the vibrating frame, which is operated whenever any key is depressed; F, the tablet-rods; G, the tablet-supporting wing, and H the bell or gong. I J are the sets of the double bank of registering-disks, adapted to be reset to their zero or starting points by a single revolution of their shafts, and K is the money drawer or till, located in the lower part of the case A.

In all of the machines above referred to springs were employed to reset the vibrating frame and keys, to throw in the supporting-wing and actuate the bell-hammer, and to hold the dogs in engagement with the registering-disks. This employment of springs, as above indicated, has been found to be objectionable for two reasons, the first of which is, that by use they become crystallized and are apt to break, thereby rendering the machine inoperative, and the second of which is, that to insure the perfect working of the parts every time the machine was operated they had to be of such strength as to require considerable force to be exerted in operating any one of the keys, thus making the working of the machine quite laborious. To remedy these defects we provide rearward extensions to the side arms of the vibrating frame E, which extensions are formed into weights L, which may be either integral with the side arms of the vibrating frame, or may be connected thereto and made adjustable, if desired, thus producing a counterbalanced vibrating frame that will reset itself and return the key to its normal position after every operation. In this manner the unequal strain on the vibrating frame, occasioned by inequality in or improper location of the springs, is entirely avoided.

The next feature of our invention consists in securing a weight, N, to an inwardly-projecting arm or extension of the wing G, Fig. 1, in such manner that the weight causes the resetting of the wing and operates the bell-hammer O, thereby dispensing with the spring formerly employed for this purpose.

The improvements above designated not only materially cheapen the construction of the machine, but they render its operation more certain and reliable, and there is nothing about them to break or possibly get out of order, and this is very important, when it is considered that machines of this class are generally operated by persons supposed to be hostile to their use, and who often subject them to the most severe usage possible.

The next feature of our invention consists in the employment of a lock to be secured to any convenient part of the case, and preferably located within the same, but accessible by means of a key in the possession of the proprietor, and with its bolt so arranged that by projecting it it engages with some of the operating parts of the machine in such manner as to lock the entire machine and prevent its being operated or tampered with during such times as it is not desired to be used in the ordinary course of business.

As an additional illustration of this feature of our invention, reference is made to Fig. 2, where P represents the lock, secured to the inner side of the removable cover or lid $d$ of the case A; $e$, the key-hole of the lock, extending through the lid, and $f$ the bolt, which, when projected, engages with the stop-lug $g$ upon the trip-rod R. The said trip-rod R is connected directly or indirectly to the vibrating frame E, the latter, as aforesaid, being actuated by the depression of any one of the keys. It will be readily seen from this construction that by locking the trip-rod R the vibrating frame is thereby locked, and the keys held up and prevented from being depressed.

The remaining features of our invention relate to the drawer locking and releasing mechanism, and are illustrated particularly in Figs. 1, 3, and 5, where S is a lever or arm journaled in ears $h$, preferably forming part of a metal support, T, secured to the upper wall of the drawer-compartment, and which lever is held up by a spring, $i$, in constant engagement with the front cross-piece of the vibrating frame E. The rear end of this lever has pivoted to it a bolt, U, which is confined in a vertical aperture in an enlarged recessed projection, $j$, of the support T. The lower end of the bolt is beveled, as shown at $u$, Fig. 1, and the projection $j$, which extends into the drawer-compartment, is provided with a horizontal slot, $k$, opening toward the front, and having its mouth flared or beveled, as shown at $l$ $l$.

Upon the rear top side of the drawer, which is suitably recessed, is secured the locking-plate V, provided with a transversely-elongated opening, $m$, and having its rear edge beveled off. The plate V, having the opening or slot $m$, is horizontal, and is provided at its inner or front side with depending ears $v$, (see Figs. 1 and 5,) which lie in recesses in the drawer-back, as shown in Fig. 1, and are perforated for the passage of screws $v'$, which secure the plate V to the drawer-back. It will be seen from this construction that when the drawer is pushed in the plate V passes into the slot $k$ and raises the bolt U, which instantly thereafter drops and engages with the walls of the opening $m$ in the plate, as will be readily understood.

W is any suitable projecting spring, which is compressed when the drawer is locked, and which, when the bolt is raised by the operation of any of the keys, partially propels the drawer from its case.

To insure the more perfect working of the drawer we provide rollers $n$, which are set in recesses in the bottom board near each side of the drawer-compartment in the bottom of the case, and upon which the drawer rests and travels.

The advantages of the above construction of the drawer mechanism will be apparent when it is understood that these machines are frequently required for use on soda-fountain counters, where there is more or less slop, which is apt to get into the drawer-compartment and cause the wood to swell and the drawer to bind.

We are enabled, by the means above referred to, to make the drawer sufficiently small to counteract the effects of the swelling, and at the same time, by means of the plate V and the flaring mouth of the slot $k$, to always insure the proper locking of the drawer whenever it is pushed in.

Having thus fully described our invention, we claim—

1. In a cash register and indicator, the combination, with a series of keys of fixed values, a series of tablets, and registering mechanism, said tablets and registering mechanism being operated at each stroke of any of the keys, of the vibrating frame E, having its rear part weighted, substantially as described, whereby said frame automatically resets itself and causes the return of the keys, as and for the purpose specified.

2. In a cash register or indicator, the combination, with the tablet-supporting wing G, tablet-rods F, and bell-hammer O, of the weight N, secured to the supporting-wing, whereby the action of said wing in resetting itself and sounding the bell is rendered automatic, substantially as described.

3. The combination, in a cash register and indicator, of a drawer, a series of keys, as described, registering-disks therefor, alarm and drawer-bolt devices, a top rod, R, provided with a stop-lug, $g$, means for vibrating said rod R upon the depression of any one of the keys, and a lock, P, having a bolt, f, for securing said rod R against movement and preventing the operation of the keys and other parts recited, and means for operating said lock, substantially as set forth.

4. The combination, with the vibrating frame E, of the lever S, vertical bolt U on the rear end of said lever, the support I, provided with the head j, having an opening for said bolt, a slot, k, formed in said head, and having a flaring mouth, the money drawer or till K, and slotted locking-plate V, secured thereto, substantially as set forth.

5. The combination, with the vibrating frame E, of the lever S, vertical bolt U, secured to the rear end of said lever, the head j, having an opening for said bolt, and a slot, k, formed in said head, and having a flaring mouth, the money drawer or till K, the slotted locking-plate V, secured thereto, and rollers n, hung on the under side of the drawer, substantially as set forth.

FRANK J. PATTERSON.
ISAAC P. DAVIS.

Witnesses to F. J. Patterson's signature:
JOHN CRAWFORD,
CHAS. W. BELL.
Witnesses to Isaac P. Davis's signature:
WILLIAM P. SULLIVAN,
JNO. H. PATTERSON.